Feb. 29, 1944.  W. J. COULTAS ET AL  2,342,844
TRACTOR MOWER
Filed Aug. 31, 1942   2 Sheets-Sheet 1
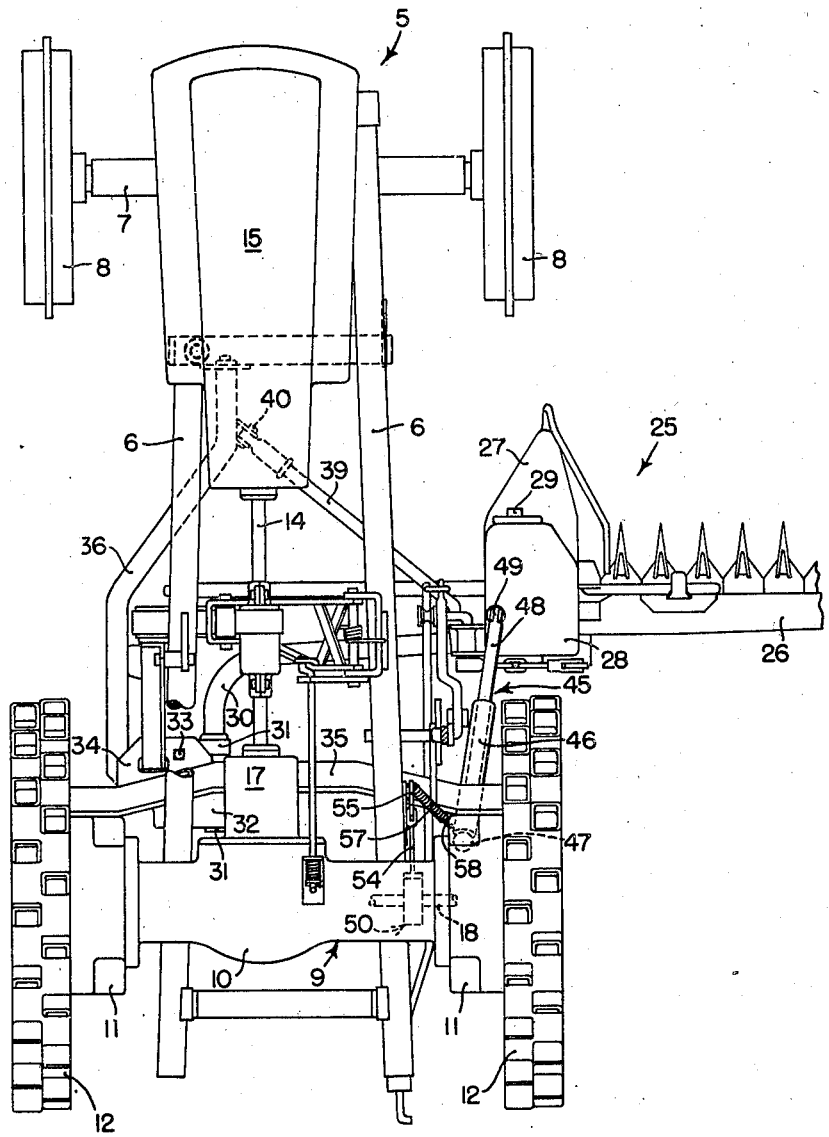
FIG. 1
INVENTORS
WILBUR J. COULTAS
ELLSWORTH T. JOHNSON
BY
ATTORNEYS Feb. 29, 1944. W. J. COULTAS ET AL 2,342,844
TRACTOR MOWER
Filed Aug. 31, 1942 2 Sheets-Sheet 2

INVENTORS
WILBUR J. COULTAS
ELLSWORTH T. JOHNSON
ATTORNEYS

Patented Feb. 29, 1944

2,342,844

UNITED STATES PATENT OFFICE 2,342,844

TRACTOR MOWER

Wilbur J. Coultas and Ellsworth T. Johnson, Moline, Ill., assignors to Deere & Company, Moline, Ill., a corporation of Illinois Application August 31, 1942, Serial No. 456,828

16 Claims. (Cl. 56—25)

The present invention relates generally to tractor mowers and more particularly to tractor mowers of the type in which the mower cutter bar is swingably mounted on the frame of the tractor providing for movement from a normal operating position ahead of one of the wheels of the tractor, to a rearwardly trailing position behind the tractor wheel. In United States Patent No. 2,292,362, issued August 11, 1942, to W. J. Coultas, a mower of this type is disclosed, in which the cutter bar shoe is provided with a ramp, over which the traction wheel of the tractor rolls as the mower cutter bar swings rearwardly to a trailing position. As stated in the patent, the purpose of swinging the entire cutter bar and shoe rearwardly beneath the tractor wheel to a trailing position is to permit the mower to clear an obstruction encountered during operation in the field, regardless of whether the obstruction engages the outer end of the cutter bar or the inner end of the cutter bar, or even the mower shoe itself. In other types of mowers which are mounted alongside the tractor in full view of the operator, either the cutter bars are pivoted for horizontal movement about an axis adjacent the mower shoe, in which case there is little or no rearward yielding of the shoe to an obstruction encountered thereby, or the mower is pivoted at the opposite side of the tractor but is adapted to swing rearwardly to an extent limited by the engagement of the mower with the tractor wheel. Although the mower disclosed in the above-mentioned patent has proved to be very successful when used on a rubber tired tractor, under certain conditions it is desirable to raise the tractor wheel over the cutter bar without actually rolling over the implement. For example, due to the present restriction in the use of rubber, tractors are again being used with steel wheels provided with heavy lugs to obtain traction. Under these circumstances, it is desirable that the lugs of the wheel are lifted over the mower to clear the latter, as will be readily appreciated.

The principal object of the present invention, therefore, relates to the provision of a mower of the type described above, which swings rearwardly beneath the tractor wheel when an obstruction is encountered during operation, together with means for raising the wheel clear of the mower as the latter swings beneath the wheel. In the accomplishment of this object, we have provided a vaulting leg, flexibly connected between the tractor and the mower, so that forward movement of the tractor after the mower has encountered an obstruction, causes the mower frame to vault over the cutter bar to a height sufficient to clear the latter.

In the conventional tractor, the mower is mounted in laterally extending position on one side of the tractor ahead of one of the rear traction wheels. The two laterally spaced traction wheels are driven from the tractor engine through a conventional differential gear mechanism, providing for rotation of the two traction wheels at different speeds when the tractor makes a turn, with equal tractive effort applied to the two wheels, as it well-known to those skilled in the art. With this type of drive mechanism, however, when one of the two traction wheels is lifted clear of the ground, the other traction wheel loses its tractive power, and the elevated wheel is merely spun around idly, as is also well-known. Therefore, it is a further object of the present invention to restrain the rotative movement of the raised wheel in order to permit the power of the engine to be transmitted to the opposite wheel so that the tractor will be moved forward to permit the mower to assume a rearwardly trailing position. Although the momentum of the tractor is usually sufficient to carry the wheel over the mower, it is more important that the power of the engine can be transmitted to the opposite wheel in the reverse direction to permit the tractor to be backed rearwardly over the mower, in order to restore the latter to its normal operating position. A further and related object, therefore, has to do with the provision of means for holding the traction wheel on the side of the tractor adjacent the mower, while the tractor is being backed over the implement to restore the latter to its operating position. We have accomplished this object by connecting one of the differential brakes of the tractor to the vaulting leg in such a manner that the brake on the side of the mower is applied as soon as the mower starts to swing rearwardly, thus preventing the raised wheel from spinning during the time that the mower is under the wheel and behind the wheel in trailing position.

These and other objects and advantages of our invention will be apparent to those skilled in the art after a consideration of the following description, in which reference is had to the drawings appended hereto, in which Figure 1 is a plan view of a tractor mower embodying the principles of the present invention;

Figure 2:
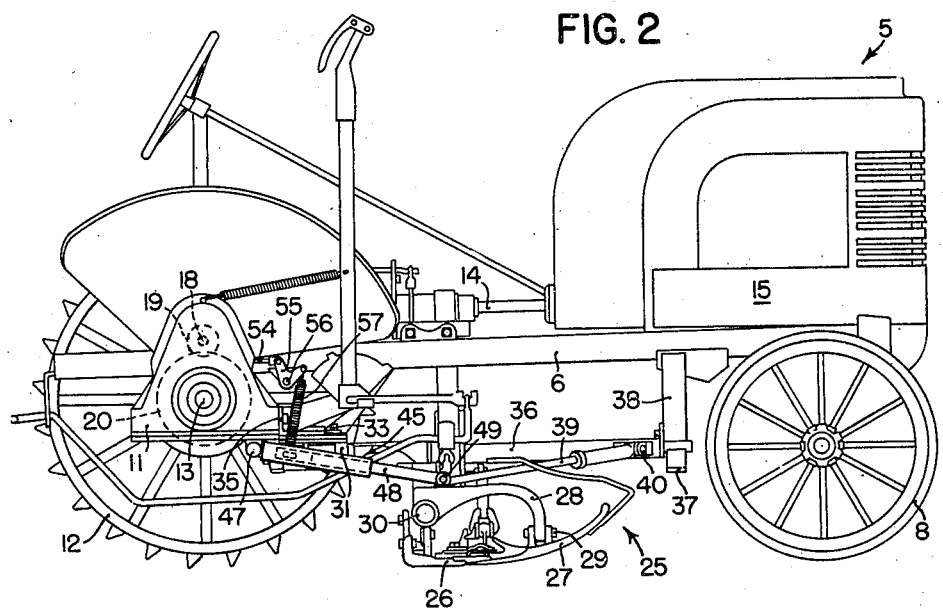
Figure 2 is a side elevational view of the tractor mower, with the near traction wheel removed to more clearly show the details of construction.

Referring now to the drawings, the tractor is indicated in its entirety by the reference numeral 5 and comprises a longitudinal frame including a pair of laterally spaced fore and aft extending frame members 6 carried at their forward ends on a transverse front axle 7, at opposite ends of which are journaled dirigible front wheels 8, respectively. The rear ends of the frame members 6 are rigidly fixed to a transverse rear axle housing 9, having an intermediate differential enclosure 10 and a pair of depending final drive housings 11 at opposite ends of the housing 9. Each housing 11 is carried on a rear traction wheel 12, which is journaled on an axle 13 disposed in the lower portion of the final drive housing 11. The traction wheels 12 are driven from a transmission shaft 14, extending rearwardly from an engine compartment 15 at the forward end of the frame 6, and journaled at its rear end in a transmission casing 17, which contains suitable change speed gears (not shown), which are connected through any conventional differential mechanism (not shown) within the differential enclosure 10, to a pair of laterally extending drive shafts 18, which extend laterally from the differential enclosure 10 through the housing 9 to drive a driving pinion 19 in each of the final drive housings 11. The pinions 19 are in meshing engagement with gears 20, the latter being fixed to the wheel axles 13, respectively. The above-mentioned wheel driving mechanism is conventional and is not a part of the present invention, but is adapted to transmit power from the engine to the wheels 12 in such a manner that equal tractive effort is maintained on both wheels at all times, permitting the wheels to travel at different speeds, as when going around corners, as is well-known to those skilled in the art.

Mounted beneath the center of the tractor frame intermediate the front and rear wheels 8, 12, is a mower 25, which is generally of the type disclosed in the above-identified Coultas patent, to which reference may be had for a complete and detailed disclosure of the mower. For present purposes, a brief and concise description of the latter is deemed sufficient. The mower 25 comprises a cutter bar 26 fixed to a shoe 27, which is connected to a shoe arch 28 by means of pivot bolts 29 disposed on a fore and aft extending axis, providing for vertical swinging movement of the cutter bar thereabout. The shoe arch 28 is fixed to a laterally extending supporting arm 30, which curves rearwardly at its inner end and is journalled in suitable bearings 31, providing for vertical swinging movement of the arm 30 in a transverse plane. The bearings 31 are carried by a supporting casting 32, which is pivotally mounted by means of a vertical pivot bolt 33 on a plate 34, the latter being secured to a transverse beam 35 which is attached, at opposite ends thereof, respectively, to the two final drive housings 11 of the tractor. A forwardly extending arm 36 is fixed to the supporting casting 32, the forward end of the arm 36 being releasably retained by a latch mechanism 37, carried on a depending arm 38, which is fixed to the tractor frame 6. A drag link 39 is pivotally connected at 40 to the forward end of the arm 36 and extends rearwardly and outwardly and is connected at its rear end to the shoe arch 28, by means providing for vertical swinging movement of the latter. Thus, the cutter bar 26, the supporting arm 30, the supporting casting 32, the latch arm 36, and the drag link 39, form an assembly which is pivotally associated with the tractor for swinging movement about the vertical axis of the pivot bolt 33. During normal operation, the cutter bar is disposed transversely of the line of advance of the tractor, outside of the plane of the traction wheel 12, with the shoe 27 directly ahead of the latter, and in this position the cutter bar is secured by the latch 37 until the cutter bar 26 or shoe 27 encounters an obstruction, such as a stump or stone, whereupon continued forward movement of the tractor forces the forward end of the arm 36 out of the latch 37, as the mower assembly pivots in a clockwise direction as viewed in Figure 1, about the vertical axis of the pivot bolt 33.

Figure 3:
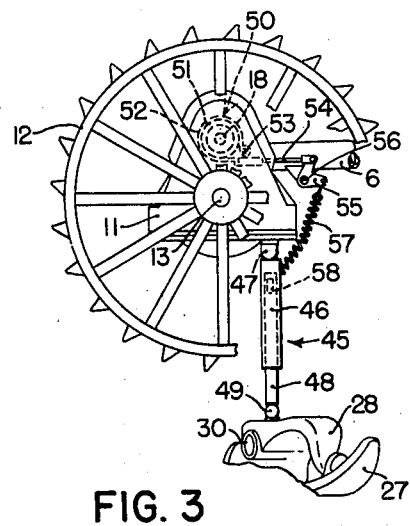
Figure 3 is a fragmentary side elevational view, showing the wheel and vaulting leg as the wheel is raised over the mower shoe.
Figure 4:
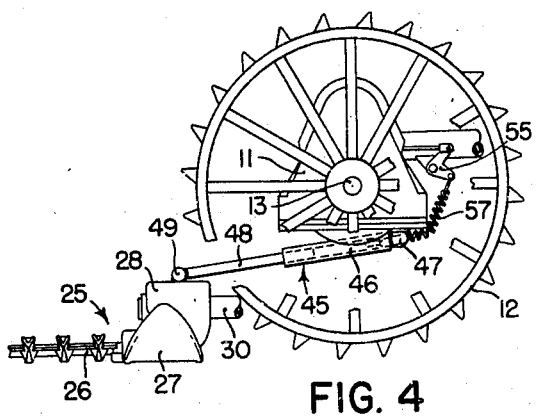
Figure 4 is a fragmentary view showing the mower in a rearwardly trailing position behind the wheel.

The traction wheel 12 adjacent the mower shoe 27 is raised over the latter as the mower swings rearwardly, by means of a vaulting leg 45, comprising an upper tubular portion 46, connected at its upper end to the final drive housing 11 by means of a ball and socket joint 47, providing for swinging movement relative to the tractor, and a lower portion 48, which is telescopically associated with the sleeve portion 46, and is connected at its outer end by a ball and socket joint 49 to the top of the shoe arch 28. Thus, the vaulting leg 45 is extensible, and in normal operating position of the mower, the leg is disposed in forwardly extended position. By virtue of the ball and socket joints 47, 49, the leg does not interfere with the vertical floating movement of the cutter bar along the ground, nor does it offer any resistance to the initial part of the rearward swinging movement of the mower just after it is released by the latch 37, during which portion of the movement the telescoping portions 46, 48 of the leg 45 merely collapse until the lower portion 48 encounters the upper closed end of the tubular portion 46, whereupon the vaulting leg becomes rigid, and further forward movement of the tractor relative to the mower 25 causes the tractor frame to vault upwardly over the shoe arch 28, through the position shown in Figure 3, in which the leg 45 is vertical, to the final position shown in Figure 4, in which the leg 45 is extended in a position rearward of the ball and socket joint 47 and the cutter bar 26 is in a trailing position behind the tractor. Thus, the vaulting leg 45 lifts the wheel 12 over the shoe arch without the lugs of the wheel coming into engagement with the latter.

As is customary in tractors of the class described, a differential brake 50 is provided for each of the drive shafts 18 for independently braking either of the tractor wheels 12. Each brake comprises a drum 51 fixed to the shaft 18, and a brake band 52 embracing the drum and anchored to a suitable anchor bolt 53 at one end of the band 52. The other end of the band is connected by means of an operating rod 54 to a bell crank 55 which is pivotally mounted at 56 on the tractor frame 6. The opposite end of the bell crank 55 is connected through a coil spring 57 to a lug 58 on the side of the tubular portion 46 of the vaulting leg. In the normal operating position of the cutter bar, as indicated in Figures 1 and 2, the brake band 52 is normally released, but as the cutter bar swings rearwardly and the vaulting leg 45 swings downwardly, the actuating spring 57 is stretched, thereby acting through the bell crank 55 to tighten the brake band 52 on the drum 51, thus braking the wheel 12 on the mower side of the tractor. This prevents the wheel from spinning idly as soon as it leaves the ground, and also prevents the tractor engine from racing, since the torque of the engine is transmitted to the wheel on the opposite side. A spring 57 provides for completion of the rearward movement of the cutter bar relative to the tractor after the brake band is tight on the drum, and holds the brake in braking position to permit the torque of the engine to be applied in reverse direction to the left-hand traction wheel to back the tractor and vault the wheel 12 rearwardly over the mower shoe as the latter is returned to is normal operating position.

We do not intend our invention to be limited to the exact details shown and described herein, except as limited by the claims which follow.

We claim:

1. In combination, a mobile frame having a supporting wheel, an implement, means mounting said implement on said frame ahead of said wheel and providing for rearward movement of said implement under said wheel to a position behind the latter as the frame advances, and means mounted on said frame at one side of said wheel for lifting the latter over said implement as the latter moves relative to said frame to a position rearward of said wheel.

2. In combination, a mobile frame having a supporting wheel, an implement, means mounting said implement on said frame ahead of said wheel and providing for rearward movement of said implement under said wheel to a position behind the latter as the frame advances, and means mounted on said frame in spaced relation to said wheel and engaging said implement for lifting said wheel over said implement as the latter moves relative to said frame to a position rearward of said wheel.

3. In combination, a mobile frame having a supporting wheel, an implement, means mounting said implement on said frame ahead of said wheel and providing for rearward movement of said implement under said wheel to a position behind the latter as the frame advances, and a vaulting leg swingably mounted on said frame and having its other end swingably connected to said implement for lifting said wheel over said implement as the latter moves relative to said frame to a position rearward of said wheel.

4. In combination with a tractor comprising a frame carried on a pair of laterally spaced traction wheels, an implement, means mounting said implement on said frame extending laterally ahead of one of said tractor wheels and providing for rearward movement of said implement under said wheel to a position behind the latter as the tractor advances, means for lifting said one wheel to clear said implement as the latter moves under the wheel, and means responsive to relative movement between said frame and implement for braking said one wheel.

5. In combination with a tractor comprising a frame carried on a pair of laterally spaced traction wheels, an implement, means mounting said implement on said frame extending laterally ahead of one of said tractor wheels and providing for rearward movement of said implement under said wheel to a position behind the latter as the tractor advances, means mounted on said frame in spaced relation to said wheel and engaging said implement for lifting said one wheel over said implement as the latter moves under the wheel, and means responsive to relative movement between said frame and implement for braking said one wheel.

6. In combination with a tractor comprising a frame carried on a pair of laterally spaced traction wheels, an implement, means mounting said implement on said frame extending laterally ahead of one of said tractor wheels and providing for rearward movement of said implement under said wheel to a position behind the latter as the tractor advances, a vaulting leg swingably mounted on said frame and having its other end swingably connected to said implement for lifting said one wheel over said implement as the latter moves under the wheel, and means responsive to relative movement between said frame and implement for braking said one wheel.

7. In combination with a tractor comprising a frame carried on a pair of laterally spaced rear traction wheels, a mower comprising a supporting arm and a cutter bar attached thereto, means for swingably mounting said arm on said frame providing for horizontal swinging movement between a normal operating position extending laterally on one side of said tractor ahead of one of said rear traction wheels and a rearwardly trailing position behind said one wheel, and a vaulting leg swingably mounted on said frame adjacent said wheel and having its other end swingably connected to said mower for lifting said one wheel over said mower as the latter moves rearwardly under the wheel.

8. In combination with a tractor comprising a frame carried on a pair of laterally spaced rear traction wheels, a mower comprising a supporting arm and a cutter bar attached thereto, means for swingably mounting said arm on said frame providing for horizontal swinging movement between a normal operating position extending laterally on one side of said tractor ahead of one of said rear traction wheels and a rearwardly trailing position behind said one wheel, and an extensible vaulting leg comprising a pair of cooperative sections connected at one end to said frame by means providing for swinging movement relative thereto and the other end swingably connected to said mower, said leg being extended forwardly in said normal operating position of said cutter bar and collapsible as the mower swings rearwardly under said wheel to a length adequate for vaulting the wheel over the mower, whereby said leg swings to a rearwardly extended position behind the tractor.

9. In combination with a tractor comprising a frame carried on a pair of laterally spaced rear traction wheels, a mower comprising a supporting arm and a cutter bar attached thereto, means for swingably mounting said arm on said frame providing for horizontal swinging movement between a normal operating position extending laterally on one side of said tractor ahead of one of said rear traction wheels and a rearwardly trailing position behind said one wheel, a vaulting leg swingably mounted on said frame adjacent said wheel and having its other end swingably connected to said mower for lifting said one wheel over said mower as the latter moves rearwardly under the wheel, and means connected with said leg for braking said wheel as the leg swings rearwardly.

10. In combination with a tractor comprising a frame carried on a pair of laterally spaced rear traction wheels, a mower comprising a supporting arm and a cutter bar attached thereto, means for swingably mounting said arm on said frame providing for horizontal swinging movement between a normal operating position extending laterally on one side of said tractor ahead of one of said rear traction wheels and a rearwardly trailing position behind said one wheel, and an extensible vaulting leg comprising a pair of cooperative sections connected at one end to said frame by means providing for swinging movement relative thereto and the other end swingably connected to said mower, said leg being extended forwardly in said normal operating position of said cutter bar and collapsible as the mower swings rearwardly under said wheel to a length adequate for vaulting the wheel over the mower, whereby said leg swings to a rearwardly extended position behind the tractor, means for braking said wheel, and resilient means connected with said leg for applying said braking means during rearward movement of said leg as the mower swings rearwardly.

11. In combination, a mobile frame having a supporting wheel, an implement connected to said frame and extending laterally therefrom ahead of said wheel, said implement being connected to the frame by means providing for rearward movement of the implement under said wheel to a position behind the latter as the frame advances, and supporting means for said frame supplemental to said wheel and effective to relieve the weight of said frame from said wheel to facilitate movement of said implement thereunder.

12. In combination, a tractor having a supporting wheel, a mower cutter bar connected to said frame and extending laterally therefrom ahead of said wheel, said cutter bar being connected to the frame by means providing for rearward movement of the cutter bar under said wheel to a position behind the latter as the tractor advances, and supporting means for said tractor supplemental to said wheel and effective to relieve the weight of said tractor from said wheel to facilitate movement of said cutter bar thereunder.

13. In combination, a tractor having a supporting wheel, a mower including a cutter bar disposed laterally outwardly of said wheel, a shoe at the inner end of said cutter bar, a shoe arch to which said cutter bar is pivotally connected, and a support for said shoe arch movably connected to said tractor inwardly of said wheel by means providing for movement of said cutter bar rearwardly to a trailing position behind said wheel, a portion of said mower being adapted to pass beneath said wheel during said rearward movement, and supporting means for said tractor supplemental to said wheel and responsive to rearward movement of said cutter bar to relieve the weight of said tractor from said wheel to facilitate movement of said cutter bar thereunder.

14. The combination set forth in claim 13, including the further provision of means for preventing said wheel from spinning when the latter is raised by said supplemental supporting means.

15. In combination, a tractor having a supporting wheel, a mower including a cutter bar disposed laterally outwardly of said wheel, a shoe at the inner end of said cutter bar, a shoe arch to which said cutter bar is pivotally connected, and a support for said shoe arch movably connected to said tractor inwardly of said wheel by means providing for movement of said cutter bar rearwardly to a trailing position behind said wheel, a portion of said mower being adapted to pass beneath said wheel during said rearward movement, a vaulting leg swingably mounted on said tractor and having its other end swingably connected to said shoe arch for relieving the weight of said tractor from said wheel, responsive to rearward movement of said cutter bar, to facilitate movement of said cutter bar under said wheel.

16. In combination, a tractor having a supporting wheel, a mower including a cutter bar disposed laterally outwardly of said wheel, a shoe at the inner end of said cutter bar, a shoe arch to which said cutter bar is pivotally connected, and a support for said shoe arch movably connected to said tractor inwardly of said wheel by means providing for movement of said cutter bar rearwardly to a trailing position behind said wheel, a portion of said mower being adapted to pass beneath said wheel during said rearward movement, a vaulting leg comprising a pair of telescopically related sections, one section being swingably mounted on said tractor and the other section being swingably connected to said shoe arch, said leg being collapsible to rigidly support the weight of the tractor on the shoe arch to relieve said weight from the wheel as the mower moves rearwardly thereunder.

WILBUR J. COULTAS.
ELLSWORTH T. JOHNSON.